(12) United States Patent
Paul et al.

(10) Patent No.: US 12,386,735 B2
(45) Date of Patent: Aug. 12, 2025

(54) SOFTWARE DRIVEN DYNAMIC MEMORY ALLOCATION AND ADDRESS MAPPING FOR DISAGGREGATED MEMORY POOL

(71) Applicant: Intel Corporation, Santa Clara, CA (US)

(72) Inventors: Barun Bikash Paul, San Jose, CA (US); Rita Deepak Gupta, Cedar Park, TX (US); Suresh Thirumandas, Cupertino, CA (US)

(73) Assignee: Intel Corporation, Santa Clara, CA (US)

( * ) Notice: Subject to any disclaimer, the term of this patent is extended or adjusted under 35 U.S.C. 154(b) by 813 days.

(21) Appl. No.: 17/482,304

(22) Filed: Sep. 22, 2021

(65) Prior Publication Data

US 2022/0004488 A1 Jan. 6, 2022

(51) Int. Cl.
*G06F 12/02* (2006.01)
*G06F 12/06* (2006.01)
*G06F 12/1081* (2016.01)
*G06F 12/1072* (2016.01)

(52) U.S. Cl.
CPC ...... *G06F 12/0238* (2013.01); *G06F 12/0607* (2013.01); *G06F 12/0646* (2013.01); *G06F 12/1081* (2013.01); *G06F 12/1072* (2013.01)

(58) Field of Classification Search
CPC ............. G06F 12/0238; G06F 12/0607; G06F 12/0646; G06F 12/1081; G06F 12/1072
See application file for complete search history.

(56) References Cited

U.S. PATENT DOCUMENTS

| | | | |
|---|---|---|---|
| 6,356,991 B1 * | 3/2002 | Bauman | G06F 12/0292 |
| | | | 711/155 |
| 2016/0283399 A1 * | 9/2016 | Das Sharma | G06F 13/4282 |
| 2018/0019006 A1 * | 1/2018 | Brandl | G06F 12/1018 |
| 2021/0133159 A1 * | 5/2021 | Bono | G06F 16/1744 |

\* cited by examiner

*Primary Examiner* — Kenneth M Lo
*Assistant Examiner* — Hewy H Li
(74) *Attorney, Agent, or Firm* — Compass IP Law PC

(57) ABSTRACT

The apparatus of a disaggregated memory architecture (DMA) including a shared memory and multiple nodes is programmable by a primary node of the DMA. The primary node executes a programming agent to, prior to memory access requests to the shared memory, cause a programming of register entries of one or more registers of a memory pooling circuitry (MPC) with information to be used by a decoder of the MPC to translate host physical addresses (HPA) of memory access requests of the nodes to local memory addresses (LMAs). The LMAs are to be processed by one or more memory controllers (MCs) based on MC memory regions in each of the one or more MCs, the MC memory regions having a predetermined memory size granularity. At least some of the LMAs map to non-contiguous memory regions of the shared memory and of the one or more MCs.

20 Claims, 6 Drawing Sheets

SOFTWARE DRIVEN DYNAMIC MEMORY ALLOCATION AND ADDRESS MAPPING FOR DISAGGREGATED MEMORY POOL

FIELD

The instant disclosure pertains to computing systems in a pooled memory environment, and in particular (but not exclusively) to memory access between components in a computing system.

BACKGROUND

Resource disaggregation is becoming increasingly prevalent in emerging computing scenarios such as cloud (aka hyperscaler) usages, where disaggregation provides the means to manage resource effectively and have uniform landscapes for easier management. While storage disaggregation is widely seen in several deployments, for example, Amazon S3, compute and memory disaggregation is also becoming prevalent with hyperscalers like Google Cloud.

One of the challenges with disaggregated memory architectures (DMAs) (or pooled memory architectures, or disaggregate/pooled memory platforms, which may correspond to data centers) is the overall increased latency to memory. Local memory within a node can be accessed within 100 ns (nanoseconds) or so, whereas the latency penalty for accessing disaggregated memory resources over a network is much higher.

Current solutions for executing such applications on disaggregated architectures being pursued by hyperscalers is to tolerate high remote latencies (that come with disaggregated architectures) to access hot tables or structures and rely on CPU caches to cache as much as possible locally. However, this provides less than optimal performance and limits scalability

BRIEF DESCRIPTION OF THE DRAWINGS

Like reference numbers and designations in the various drawings indicate like elements.

DETAILED DESCRIPTION

Although the drawings depict particular computer systems, the concepts of various embodiments are applicable to any suitable integrated circuits and other logic devices. Examples of devices in which teachings of the present disclosure may be used include desktop computer systems, server computer systems, storage systems, handheld devices, tablets, other thin notebooks, systems on a chip (SOC) devices, and embedded applications. Some examples of handheld devices include cellular phones, digital cameras, media players, personal digital assistants (PDAs), and handheld PCs. Embedded applications may include a microcontroller, a digital signal processor (DSP), a system on a chip, network computers (NetPC), set-top boxes, network hubs, wide area network (WAN) switches, or any other system that can perform the functions and operations taught below. Various embodiments of the present disclosure may be used in any suitable computing environment, such as a personal computing device, a server, a mainframe, a cloud computing service provider infrastructure, a datacenter, a communications service provider infrastructure (e.g., one or more portions of an Evolved Packet Core), or other environment comprising a group of computing devices.

Figure 1:
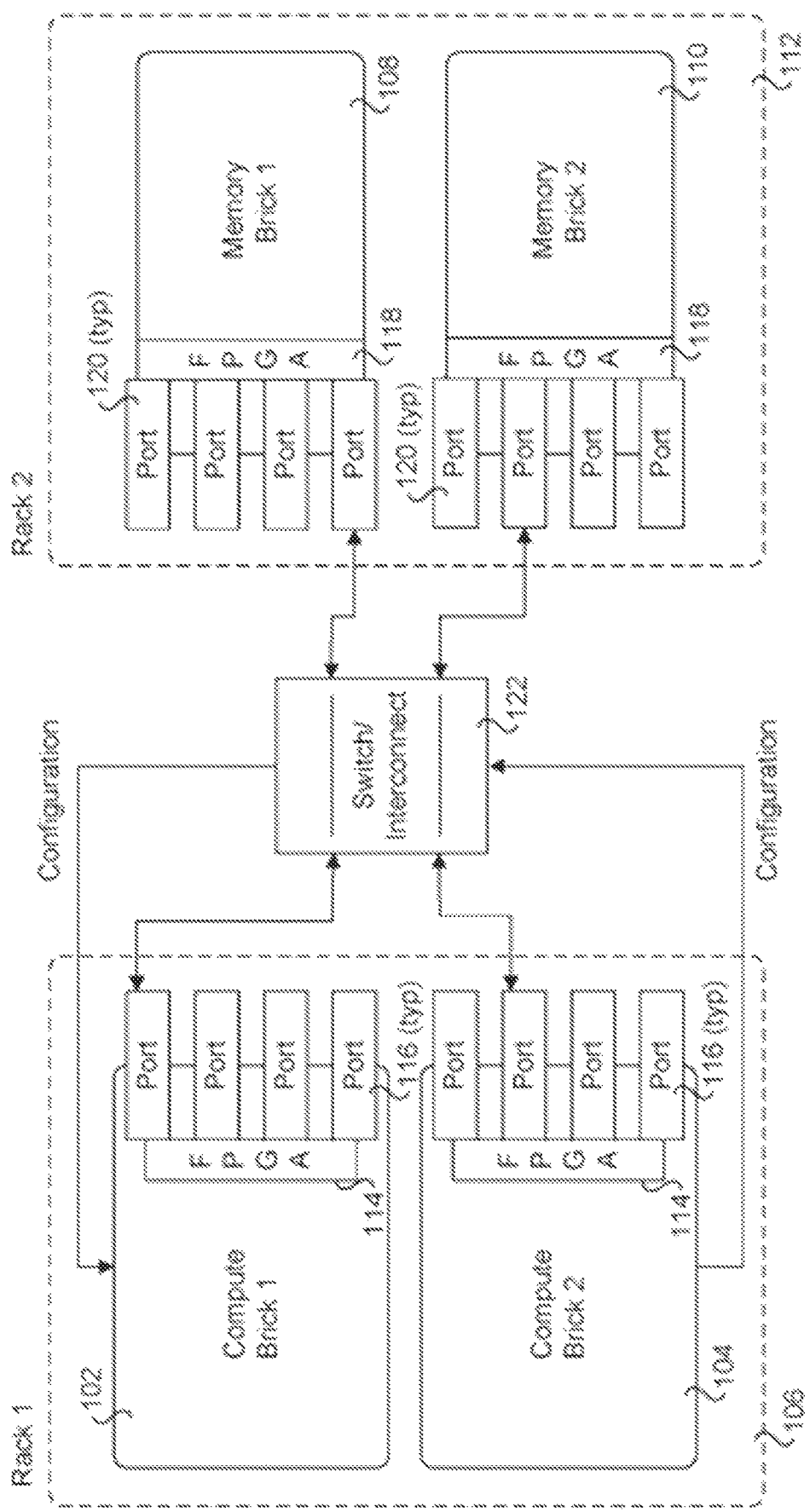
FIG. 1 illustrates a schematic diagram illustrating an example of a disaggregated architecture in which compute resources in compute bricks are connected to disaggregated memory in memory bricks.
Figure 2:
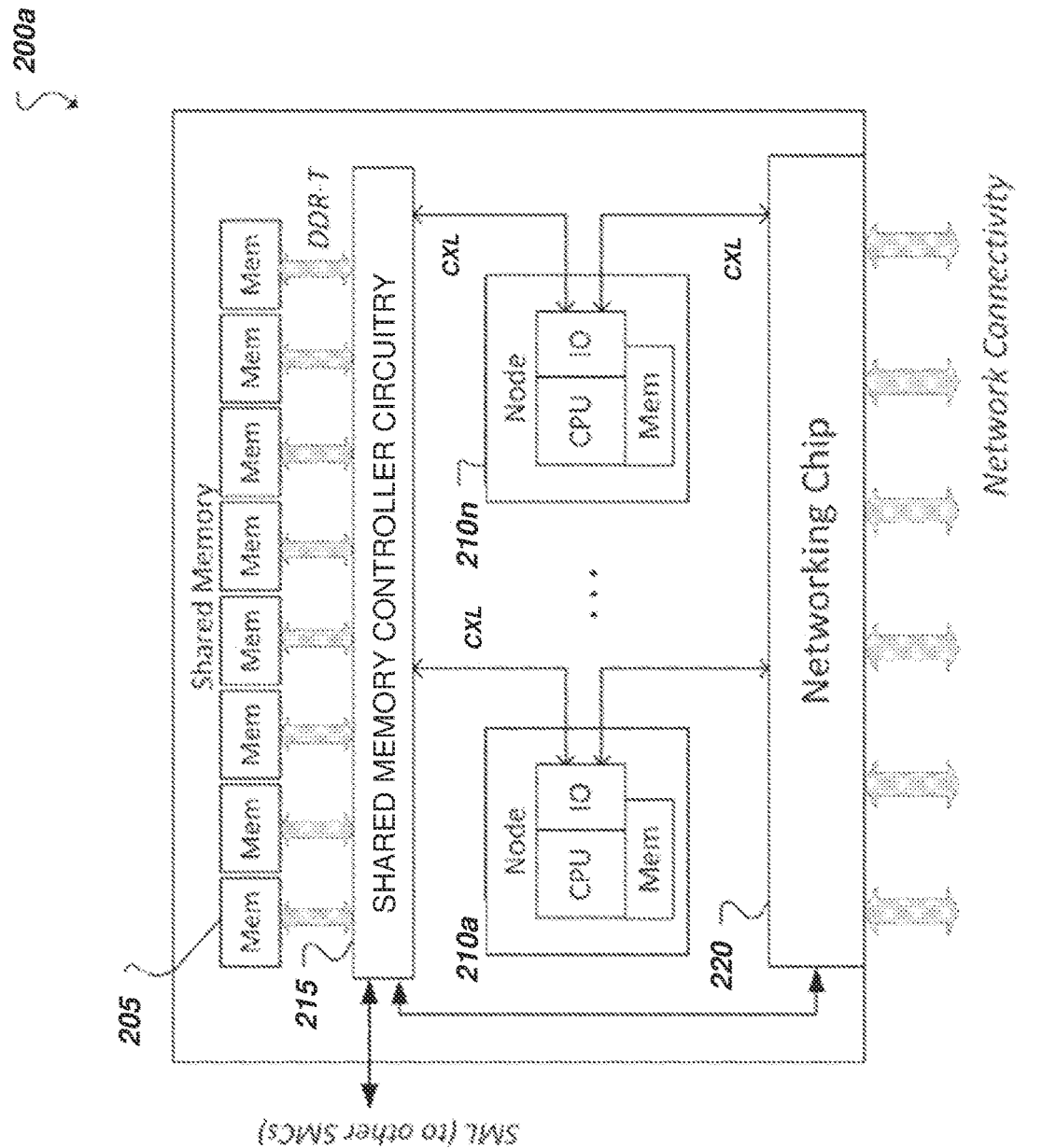
FIG. 2 illustrates an example disaggregated memory architecture including shared memory capable of being accessed using load/store techniques by each of a plurality of independent nodes.

FIGS. 1 and 2 below provided some examples of disaggregated memory (or pooled memory) architectures that may be used to implement some embodiments as will be described further below in the context of FIG. 3-6.

FIG. 1 shows an example of disaggregated architecture including pooled memory. Compute resources, such as multi-core processors (aka CPUs (central processing units)) in blade servers or server modules (not shown) in two compute bricks 102 and 104 in a first rack 106 are selectively coupled to memory resources (e.g., DRAM DIMMs, NVDIMMs, etc.) in memory bricks 108 and 110 in a second rack 112. Each of compute bricks 102 and 104 include an FPGA (Field Programmable Gate Array 114 and multiple ports 116. Similarly, each of memory bricks 108 and 110 include an FPGA 118 and multiple ports 120. The compute bricks also have one or more compute resources such as CPUs, or Other Processing Units (collectively termed XPUs) including one or more of Graphic Processor Units (GPUs) or General Purpose GPUs (GP-GPUs), Tensor Processing Unit (TPU) Data Processor Units (DPUs), Artificial Intelligence (AI) processors or AI inference units and/or other accelerators, FPGAs and/or other programmable logic (used for compute purposes), etc. Compute bricks 102 and 104 are connected to the memory bricks 108 via ports 116 and 120 and switch or interconnect 122, which represents any type of switch or interconnect structure. For example, under embodiments employing Ethernet fabrics, switch/interconnect 122 may be an Ethernet switch. Optical switches and/or fabrics may also be used, as well as various other protocols, Ethernet, InfiniBand, RDMA (Remote Direct Memory Access), NVMe-oF (Non-volatile Memory Express over Fabric, RDMA over Converged Ethernet (RoCE), etc. FPGAs 114 and 118 are programmed to perform routing and forwarding operations in hardware.

Generally, a compute brick may have dozens or even hundreds of cores, while memory bricks, also referred to herein as pooled memory, may have terabytes (TB) or 10's of TB of memory implemented as disaggregated memory. The amount of local memory on the compute bricks is relatively small and generally limited to bare functionality for operating system (OS) boot and other such usages.

Memory resources within memory bricks 108 and 110 may in general include any memory device, such as random access memory (RAM), non-volatile (NV) memory, or other memory accessible by devices in system 100. Memory resources may be coupled to a controller hub through a memory interface (not shown). Examples of a memory interface include a double-data rate (DDR) memory interface, a dual-channel DDR memory interface, and a dynamic RAM (DRAM) memory interface.

The controller hub may be a root hub, root complex, or root controller in a Peripheral Component Interconnect Express (PCIe or PCIE) interconnection hierarchy and/or a Compute Express Link (CXL) interconnection hierarchy based on the CXL Specification. Examples of a controller hub include a chipset, a memory controller hub (MCH), a northbridge, an interconnect controller hub (ICH) a southbridge, and a root controller/hub. Often the term chipset refers to two physically separate controller hubs, i.e. a memory controller hub (MCH) coupled to an interconnect controller hub (ICH).

Turning to FIG. 2, a simplified block diagram is shown illustrating an example pooled memory/disaggregated memory architecture (DMA) 200a including shared memory 205 capable of being accessed using load/store techniques by each of a plurality of independent nodes 210a-210n. For instance, a shared memory controller 215 can be provided that can accept load/store access requests of the various nodes 210a-210n on the system. Shared memory 205 can be implemented utilizing synchronous dynamic random access memory (SDRAM), dual in-line memory modules (DIMM), and other non-volatile memory (or volatile memory) as noted previously. Shared memory 205 may include memory anywhere in one or more DMAs. Thus, shared memory may be shared within a given DMA, or with other DMAs communicatively coupled to the given DMA via network connectivity, such as via networking chip 220.

Each node or computing system may itself have one or multiple CPUs and CPU sockets and may also include local memory that remains insulated from load/store access by other nodes in the system. The node can communicate with other devices in the pooled memory architecture (e.g., with shared memory controller 215, networking controller 220, other nodes, etc.) using one or more protocols, including Compute Express Link (CXL) (an interconnect technology for removable high-bandwidth devices, such as GPU-based compute accelerators, in a data-center environment), PCIe, QPI, Ethernet, among other examples.

SMC 215 may include logic for handling load/store requests of nodes 210a-210n. Load/store requests can be received by the SMC 215 over links (such as CXL) connecting the nodes 210a-210n to the SMC 215. In some implementations the SMC 215 can be implemented as a device, such as an application-specific integrated circuit (ASIC), including logic for servicing the access requests of the nodes 210a-210n for shared memory resources. In other instances, the SMC 215 (as well as shared memory 205) can reside on a device, chip, or board separate from one or more (or even all) of the nodes 210a-210n. The SMC may for example be part of a node 210a-210n and located on a CPU of such node, it may be within an accelerator device, or part of a memory buffer chip.

The SMC 215 can further include logic to coordinate various nodes' transactions that involve shared memory 205. Additionally, the SMC can maintain a directory tracking access to various data resources, such as each cache line, included in shared memory 205. For instance, a data resource can be in a shared access state (e.g., capable of being accessed (e.g., loaded or read) by multiple processing and/or I/O devices within a node, simultaneously), an exclusive access state (e.g., reserved exclusively, if not temporarily, by a single processing and/or I/O device within a node (e.g., for a store or write operation), an uncached state, among other potential examples. Further, while each node may have direct access to one or more portions of shared memory 205, different addressing schemes and values may be employed by the various nodes (e.g., 210a-210n) resulting in the same shared memory data being referred to (e.g., in an instruction) by a first node according to a first address value and a second node being referring to the same data by a second address value. The SMC 215 can include logic, including data structures, to map nodes memory access requests including HPAs to shared memory resources, for example to LMAs, to allow the SMC 215 to interpret the various access requests of the various nodes and provide access to the intended address of the data from the shared memory 205.

Additionally, in some cases, some portion of shared memory (e.g., certain partitions, memory blocks, records, files, etc.) may be subject to certain permissions, rules, and assignments such that only a portion of the nodes 210a-210n are allowed (e.g., by the SMC 215) to access the corresponding data. Indeed, each shared memory resource may be assigned to a respective (and in some cases different) subset of the nodes 210a-210n of the system. These assignments can be dynamic and SMC 215 can modify such rules and permissions (e.g., on-demand, dynamically, etc.) to accommodate new or changed rules, permissions, node assignments and ownership applicable to a given portion of the shared memory 205.

An example SMC 215 can further track various transactions involving nodes (e.g., 210a-210n) in the system accessing one or more shared memory resources. For instance, SMC 215 can track information for each shared memory 205 transaction, including identification of the node(s) involved in the transaction, progress of the transaction (e.g., whether it has been completed), among other transaction information. This can permit some of the transaction-oriented aspects of traditional DMAs to be applied to the improved multi-node shared memory architecture described herein. Additionally, transaction tracking (e.g., by the SMC) can be used to assist in maintaining or enforcing the distinct and independent fault domains of each respective node. For instance, the SMC can maintain the corresponding Node ID for each transaction-in-progress in its internal data structures, including in memory, and use that information to enforce access rights and maintain individual fault-domains for each node. Accordingly, when one of the nodes goes down (e.g., due to a critical error, triggered recovery sequence, or other fault or event), only that node and its transactions involving the shared memory 205 are interrupted (e.g., dumped by the SMC)—transactions of the remaining nodes that involve the shared memory 205 continue on independent of the fault in the other node.

A pooled memory architecture can include multiple nodes. Additionally, some example pooled memory architectures can include multiple SMCs. In some cases, a node may be able to access shared memory off a remote SMC to which it is not directly attached to (i.e., the node's local SMC connects to the remote SMC through one or multiple SML Link hops). The remote SMC may be in the same board or could be in a different board. In some cases, some of the nodes may be off-system (e.g., off board or off chip) but nonetheless access shared memory 205. For instance, one or more off-system nodes can connect directly to the SMC using an SML-compliant link, among other examples. Additionally, other pooled memory architectures that include their own SMC and shared memory can also connect with the SMC 210 to extend sharing of memory 205 to nodes included, for instance, on another board that interface with the other SMC connected to the SMC over an SML link. Still further, network connections can be tunneled through to further extend access to other off-board or off-chip nodes. For instance, SML can tunnel over an Ethernet connection (e.g., provided through network controller 220) communicatively coupling the example pooled memory architecture of FIG. 2 with another pooled memory architecture that can also include one or more other nodes and allow these nodes to also gain access to SMC 215 and thereby shared memory 205, among other examples.

In CPU data centers, memory utilization is an important aspect of high-performance applications. Although adding more local DRAM memory can help overall system performance, it may be more costly and less efficient to implement, as it may lead to sub-optimal memory allocation among multiple CPUs in a given node/computing system.

Compute Express Link (CXL) based off-chip memory pooling solutions provide an effective way to solve both cost and memory utilization among multiple nodes but with little extra latency as compared with using local DRAM. Applying traditional scheduling algorithms either at CPU domain or at the Memory Controller (MC) domain is not enough to maximize the memory allocation and bandwidth as multiple CPUs are sharing the same memory pool. However, the effective allocation of the memory and flexibility for the same remains undefined in the specification.

Some embodiments propose the use of one or more memory pooling circuitries (MPCs) to implement a software driven dynamic scheduling technique in order to enhance or optimize memory utilization of available memory pool resources (i.e. within the shared memory) of a DMA (such as a data center or a portion of a data center, such as a rack) with optimum granularity. Individual ones of the MPCs may include a decoder having a register, such as a translation lookaside buffer (TLB). Being able to program the register (such as a register within SMC 215 of FIG. 2) to dynamically allocate/de-allocate ranges of memory addresses (i.e. memory regions) of the shared memory among multiple CPUs to achieve a high level of performance in the overall DMA, such as a data center. "Dynamic allocation/deallocation," or "dynamic programming" as used herein means an allocation/deallocation, or programming, which can change, for example as a function of time and/or as a function of changing parameters.

When considering multiple CPU data centers (whether the CPUs are on the same rack or different racks of the data center) and trying to optimize the memory allocations across CPUs current method have allocated memory is fairly static manner, where a set number of memory channels on each CPU dictates memory allocation to that CPU. Some embodiments provide a memory pooling solution through a MPC that is adapted to dynamically allocate memory within the shared memory across such CPUs. A novel aspects of embodiments is the use of a register, such as a TLB, to dynamically manage memory addresses, in this manner allowing an optimization of memory bandwidth allocation.

CXL based memory pooling solution provides an alternate protocol that runs across a standard PCIe physical layer. It uses a flexible CPU port that can auto-negotiate to PCIe or CXL. A first generation of the CXL protocol aligns to 32 Gbps PCIe 5. CXL may be used in a memory buffer environment such as the one shown in FIG. 2, where memory bandwidth expansion, memory capacity expansion, and/or storage class memory are to be used. There is currently no known hardware-based solution to provide optimal memory utilization managed via software in a distributed memory architecture. The current memory allocation is not dynamic but static at the time of enumeration.

For a CXL based memory pooling solution, a CPU may send a host-physical-address (HPA) for any data access from the shared memory, such as shared memory 205. The HPA may get converted, for example by SMC 215, to a device-physical-address (DPA) to map the actual local memory address (LMA) corresponding to the data to be accessed in the shared memory. Current memory controllers statically allocate DPA to LMA conversion among multiple CPUs in the system, in a static manner, and based on available CPU channels. However, the latter solution does not provide software executed by the memory controller with any visibility into address mapping within the shared memory per CPU (host), nor does it provide any control to change such DPA to LMA allocation in a dynamic, programmable manner.

According to some embodiments, a memory address map (also referred to here as a host memory map) for shared memory, implemented and controlled by a memory controller of a node in a DMA, may be segmented at a relatively small granularity (e.g. 1 GB segments), where each segment is dynamically allocated or de-allocated by software (SW) (e.g. a programming agent/fabric manager and orchestrator) to respective requesting compute nodes, such as nodes 210a-210n of a disaggregated memory architecture 200a. The allocation and deallocation may be implemented for example by using one or more memories, such as one or more registers, for example one or more TLBs. An individual register according to some embodiments may store DPA to LMA translation entries such that the LMAs obtained as a result of the translation (translated LMAs) map to memory regions in a corresponding memory controller of the register that are non-contiguous with respect to one another, and that are at a preprogrammed granularity. Memory regions within the shared memory and hence the HMM corresponding to the translated LMAs are also to exhibit the same granularity. This new software managed register implementation advantageously provides a software-based innovation of scheduling algorithms that allows dynamic memory allocation in a disaggregated memory environment. This software-based innovation translates into better memory utilization and lower memory access latency.

Latency and throughput are some of the more important aspect of off-chip memory applications as compared with on-chip memory applications. The flexibility of the dynamic memory of embodiments allows software to handle memory allocation in a most efficient way to create performance-enhanced system memory map, and further provides flexibility to manage blast radius impact and Reliability, Accessibility, Serviceability (RAS) solutions across host nodes without requiring reboot of a whole system.

Some embodiments provide a shared memory pooling circuitry that dynamically translates DPA to LMA as between nodes of a DMA.

Figure 3:
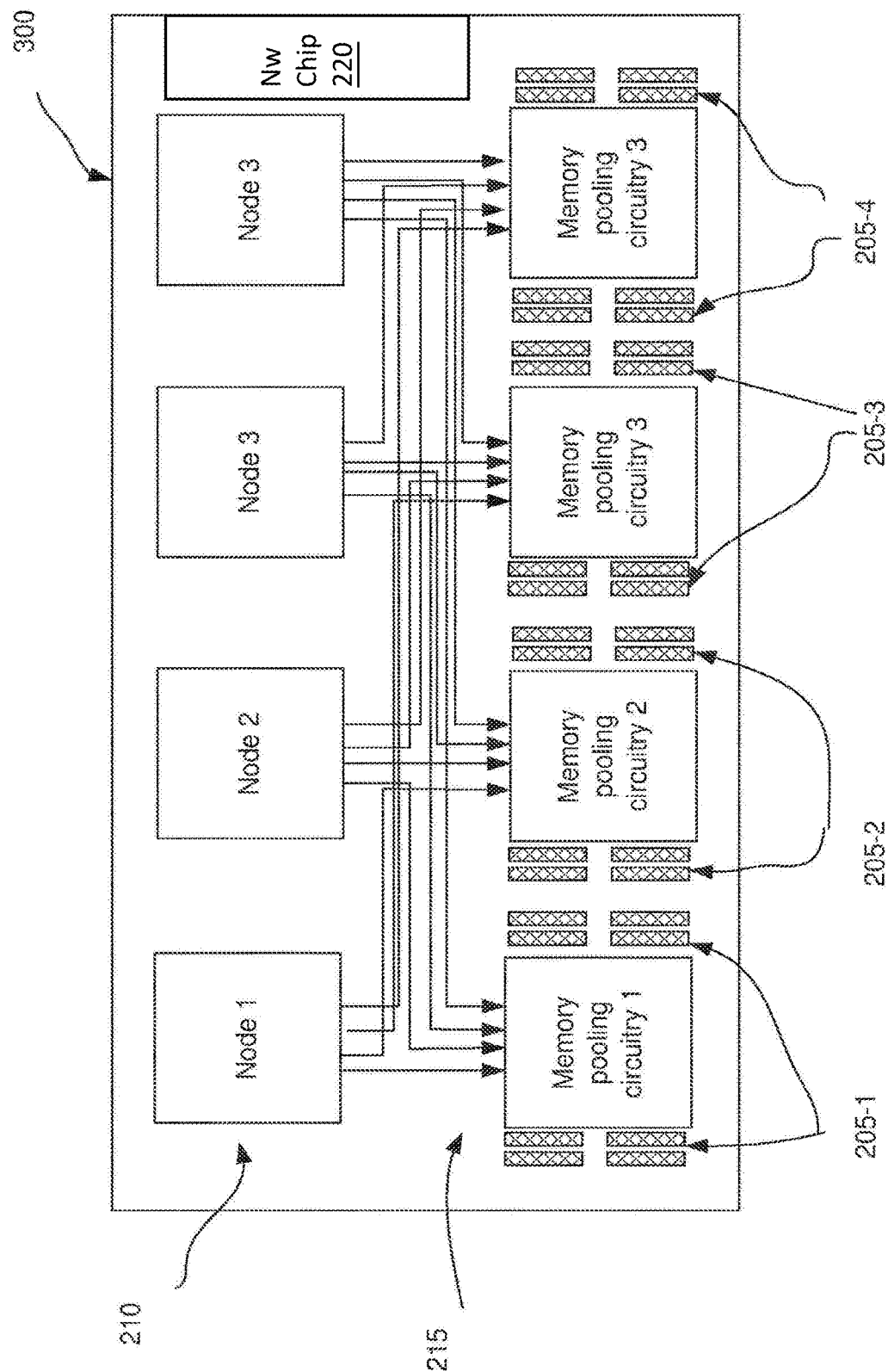
FIG. 3 illustrates a system-on-a-chip (SoC) including memory pooling circuitries (MPCs) according to one embodiment.
Figure 4:
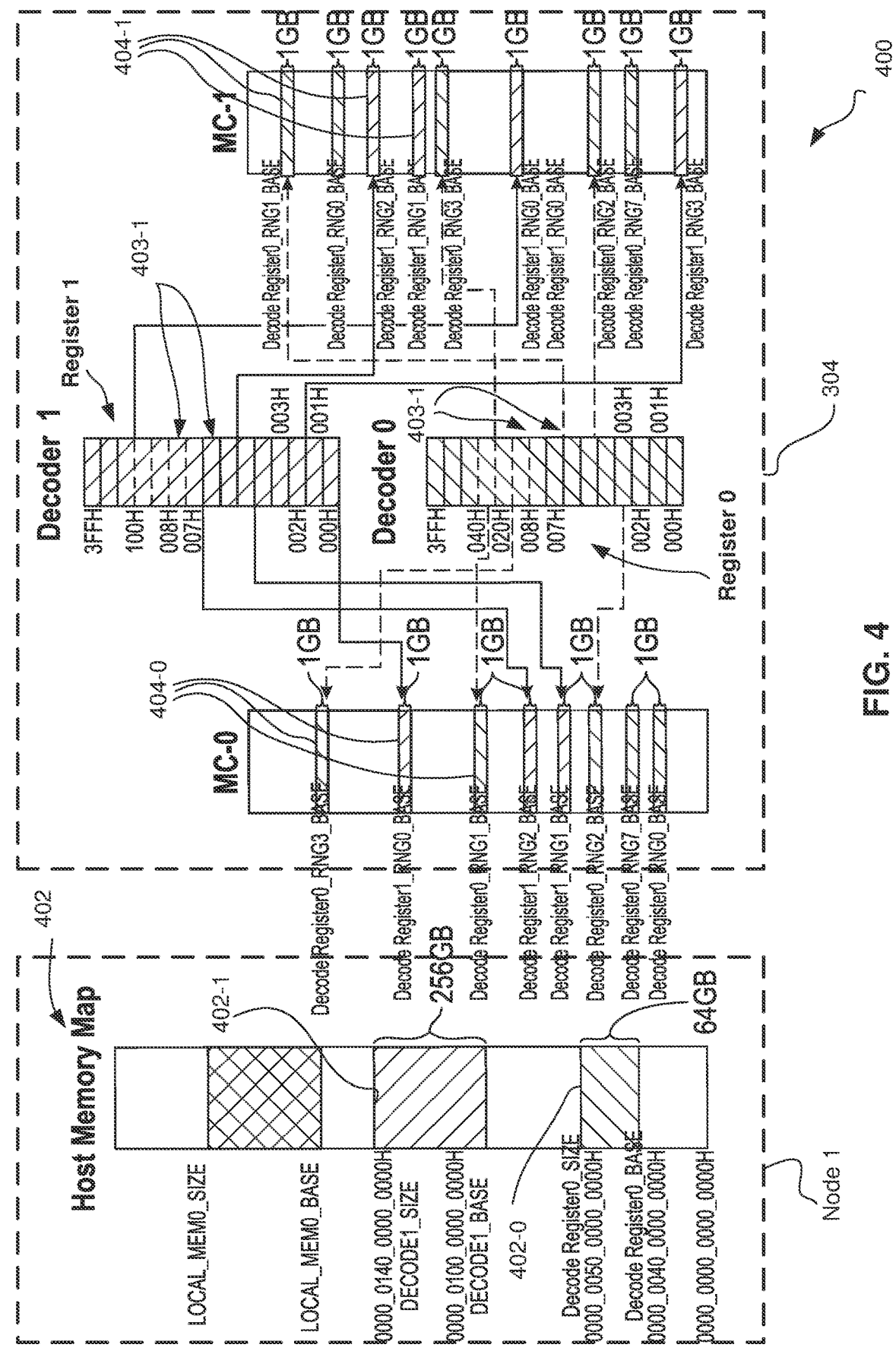
FIG. 4 illustrates an embodiment of one of the MPCs and one of the Nodes of the SoC of FIG. 3.
Figure 5:
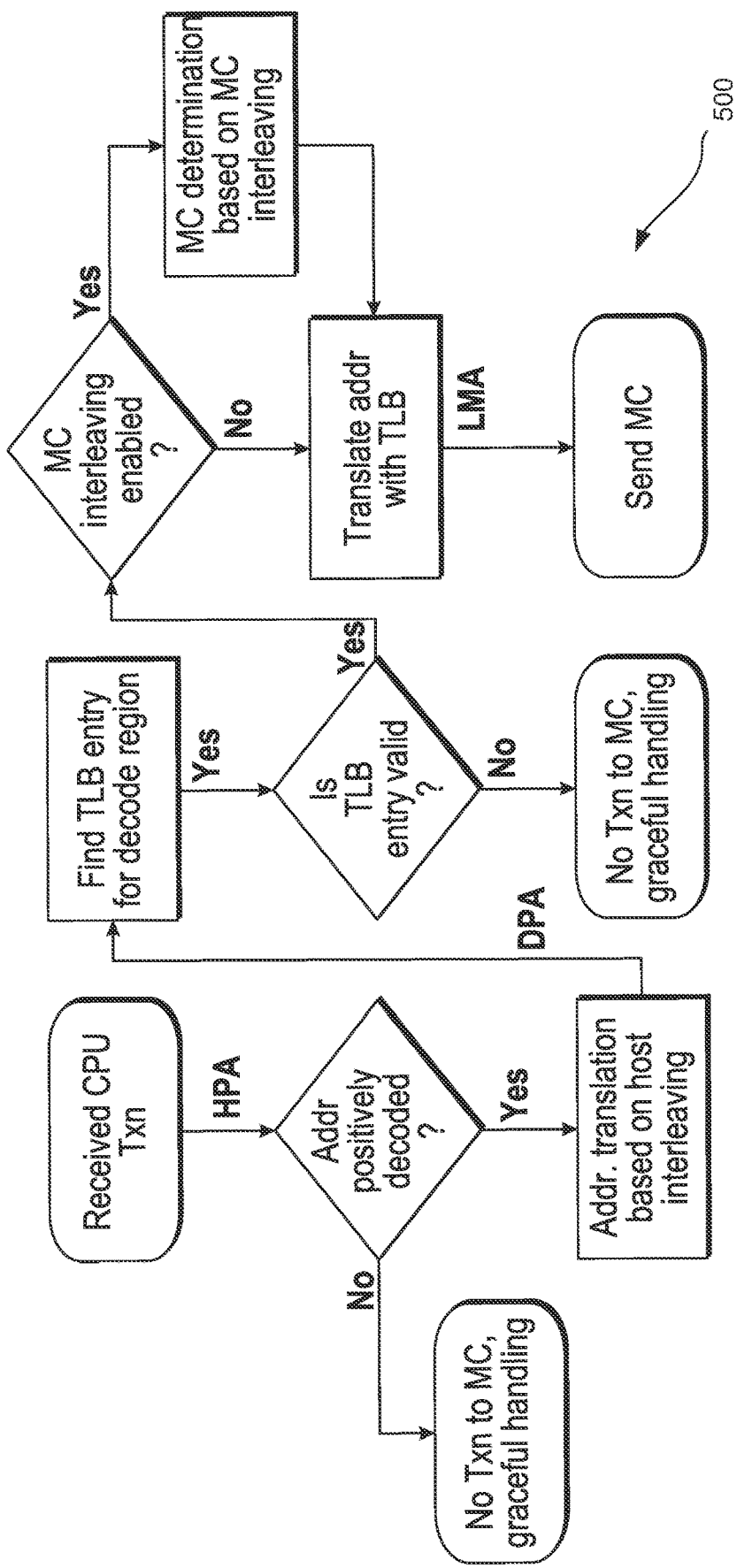
FIG. 5 illustrates a flow for the generation of a local memory address (LMA) from a host physical address (HPA) through a device physical address (DPA) at a MPC according to some embodiments.

Reference will now be made to FIGS. 3-5 in the context of further details regarding some embodiments. The architectures of FIGS. 3-4 may be used in performing methods and implementing operations as described in the context of some embodiments herein.

FIG. 3 shows an architecture 300, such as a system on a chip (SoC) 300 according to one embodiment. SoC 300 represents one embodiment of the architecture 200a of FIG. 2, with like components referred to with like reference numerals. In SoC 300, four nodes 210, Node 1, Node 2, Node 3 and Node 4 (similar to those of FIG. 2), are communicatively coupled to four memory pooling circuitries (MPCs) 1-4, with one of the nodes, such as Node 1, serving as a primary node and the other nodes serving as secondary nodes as will be explained further below. MPCs 1-4 together belong to SMC circuitry 215. Shared memory 205 in FIG. 3 is represented by clusters of DDR memory devices 205-1, 205-2. 205-3 and 205-4, with each cluster communicatively coupled to a corresponding one of the MPCs 1-4, although embodiments are not so limited.

FIG. 4 is a schematic view of an architecture 400 showing an embodiment of one of the MPCs 205 communicatively coupled with Node 1 of FIG. 3. In particular, FIG. 4 shows a fragmented memory mapped view of system memory for a given host or primary node to a two MC enabled device. In the given example, a host System Memory Management Unit (MMU) of Operating System (OS) with a primary Node, Node 1, is configured to allocate 64 GB (Gigabyte) to Decoder 0 and 256 GB to Decoder 1 to a given Node (such as any of Nodes 1-4) for the memory pooling circuitry.

In the embodiment of FIG. 4, MPC 205 includes two decoders, Decoder 0 and Decoder 1 and two MCs, MC-0 and MC-1 communicatively coupled to one another. Each of Decoders 0 and 1 is coupled to both MC-0 and MC-1. MPC 205 is coupled to the primary node, Node 1, which has access to and is adapted to program memory allocations of the shared memory 205 and within MPCs, with the allocations shown in FIG. 4 in the form of Host Memory Map (HMM) 402 and Decoder 0 and Decoder 1 registers, Register 0 and Register 1, respectively. HMM 402 shows a memory space for the data of shared memory 205, where a memory region 402-0 (range of one or more memory addresses) is shown as having been allocated to Decoder 0, and a memory region 402-1 is shown as having been allocated to Decoder 1.

The decoders in MPC 205 may include respective registers. In particular, the decoders may each include a memory, such as a register, for example a TLB, that is to store translations of DPA to LMA therefore serving as an address-translation cache. A decoder such as Decoder 0 or Decoder 1 may include a cache that is implemented as a fully associative address space so that each entry maps to a valid memory address. Therefore, there will always be a hit in the TLB access and it would be minimum access latency as a result. If the associated TLB entry for the requested address is not valid, then it would be detected as TLB error and its handling will be described in further detail in relation to FIG. 5. In the shown embodiment, each decoder is coupled to both MC-0 and MC-1.

A MPC may implement various decoders as per the CXL 2.0/CXL 3.0 or later version of CXL Specification for initial HPA to DPA address translation. The use of the number of registers per MPC according to embodiments is implementation specific. A MPC may include separate registers per decoder per primary node to simplify the design, or can have a single register for a given primary node for all decoders for address translation. The register index may, according to some embodiments, be provided by the most significant bits of the DPA. The exact bits to be used for register indexing depends on total MC memory size, granularity of memory region etc. For example, for 2 TB (Terabyte) of local memory with 1 GB of memory granularity, then bits 40:30 may be used for indexing the register. This example also signifies that the total 2K size of registers are needed to generate LMA for every incoming addresses. If the register entry is valid, then the register content may be used to translate the DPA address to LMA. If register entry is not valid, then it will be considered as an erroneous transaction and handled according to user implementation. The initial register programming according to some embodiments may be performed during an initialization phase of a DMA, where the register is programmed by the programming agent, such as a fabric manager, or hypervisor present in the platform, such as in a primary node of the architecture. It is the programming agent's responsibility to ensure that every legal register entry has a correct value to generate the corresponding LMA. According to some embodiments, a register can also be programmed during run time, but handling of all the CPU memory transactions during reprogramming is implementation specific.

The register implementation allows the programming agent to select between allocating contiguous and non-contiguous memory distribution across multiple nodes supported by one or more memory pooling circuitries.

In operation, referring now to FIGS. 3 and 4, the primary Node 1 may execute a memory programming agent, such as a hypervisor, to perform a number of operations. In particular, the primary Node 1 may, prior to a memory transaction based on one or more requests from CPUs in any of Nodes 1-4, cause a programming of the HMM 402 (i.e. of memory addresses in the shared memory) and of one or more MPCs, such as respective MPCs of FIG. 3.

Programming of the HMM may include allocating memory addresses corresponding to memory transactions of respective workloads to be non-contiguous with respect to one another in the HMM. For example, as seen in FIG. 4, the HMM 402 reflects a shared memory allocation 402-0 of a memory region within the shared memory for Decoder 0, and a shared memory allocation 402-1 of a memory region within the shared memory for Decoder 1 for MPC 205. Ranges 402-0 and 402-1 may each include one or more LMAs.

Programming each of the one or more MPCs may include programming a register of the one or more MPCs. Programming the register may include programming register entries 403-0 or 403-1 (the entries including information to translate DPAs to LMAs) such that the LMA translations result in respective LMAs to be processed by one or more memory controllers (MCs) coupled to the register based on non-contiguous MC memory regions 404-0 or 404-1 in each of the one or more MCs address spaces (representing memory space of the one or more MCs), the address regions having a predetermined granularity chosen by the programming agent. One or more of the register entries may include a field to be used to determine whether a memory access to the register is valid, a field to indicate whether MC interleaving is applicable, a field to identify which MC of a plurality of MCs are to be used to process a LMA generated by a decoding of a DPA using the register, and/or a field to indicate the granularity of the address regions. In the shown example of FIG. 4, the granularity is 1 GB, although embodiments include any granularity, such as, for example, 256 KB, 512 KB, 1 GB, 2 GB, 10 GB, or any suitable value depending on user implementation. The indication of MC interleaving may thus include an indication of an MC to which a LMA corresponding to that entry is to be sent after a decoding of the register entry by the associated decoder. Thus, the programming agent executed by the primary Node during the programming stage may cause a programming of the register entries to indicate which of a number of interleaved MCs are to process LMAs determined from the register entries for memory operations (read or write operations) on corresponding addresses in the shared memory.

The granularity of the address regions in the MC address spaces is to correspond to the granularity of corresponding address regions in the HMM. Thus, according to some embodiments, the programming agent may program the HMM to include address regions having a same granularity as that of the address regions in the MC address spaces for a given MPC.

According to some embodiments, as suggested above, a MPC 205 may include at least one decoder and at least one MC. According to some embodiments, a MPC 205 may include any number of decoders and any number of MCs. According to some embodiments, a decoder of a MPC may be communicatively coupled with one or more MCs of the MPC, and vice versa. According to some embodiments, a MPC may include one or more registers per decoder. According to some embodiments, a MPC may include at least one register per Node, at least one register per CPU.

After programming has taken place, the HMM 402 and the MPCs may maintain the same programming until a reset operation on the HMM and MPCs. After a reset operation, the programming agent may reprogram the HMM 402 and the MPCs 205-1 to 205-4.

After the programming stage, the primary Node 1 may process parallel memory access requests to access non-contiguous host memory allocations in the HMM, the parallel memory access requests by workloads to be executed by one or more of the Nodes 0-4.

After the programming stage, a memory transaction from one of the Nodes 1-4 in Soc 300 may be received by a MPC 205, and, if a register hit occurs at one of the Decoders 0 or 1, the HPAs for the memory transaction are translated into corresponding LMAs through DPAs, and sent to a corresponding MC of the MPC.

A HMM, corresponding to a memory address map for the shared memory, may thus be implemented and controlled by programming, by a primary node, of one or more MPCs in a DMA. The HMM may be segmented at a relatively small granularity (e.g. 1 GB segments), where each segment may be dynamically allocated or deallocated by the programming agent to respective requesting compute nodes of the DMA, such as respective CPUs of such compute nodes. The allocation and deallocation may be implemented for example by using one or more memories, such as one or more registers, for example one or more TLBs. This new software managed register implementation advantageously provides a software-based innovation of scheduling algorithms that allows dynamic memory allocation in a disaggregated memory environment. This software-based innovation translates into better memory utilization and lower memory access latency.

Reference is now made to FIG. 5, which illustrates a flow 500 for the generation of LMA from HPA through DPA at a MPC, such as any of MPCs 205 of FIG. 3, according to some embodiments. Once a memory transaction request by a CPU of any of Nodes 1-4 is received at the MPC with a request for memory access, if the HPA address is successfully decoded, the MC translates the HPA to a DPA, and finds the corresponding register entry for the decode region of the memory address corresponding to the DPA. If the register entry is valid, the MC translates the DPA to LMA based on the register entry. The decoder logic uses the interleaving option in the register to determine the destination MC. If interleaving is not enabled, then memory transaction with LMA is directed to the pre-defined MC.

Without the register in the MPC, there is no HMM visible to a node, and memory address allocation for the shared memory is one to one. Thus, in current mechanisms, if, at a given time instance, multiple memory access requests corresponding to multiple memory transactions are to access the same region of the of the shared memory, the prior art serializes such memory accesses in time, hence affecting latency and bandwidth for shared memory access. Instead, according to some embodiments, when a MC decodes and accesses the actual memory devices of the shared memory, efficient decoding made possible by fragmented memory regions of the shared memory advantageously allows the execution of parallel operations instead of serialized operations.

According to embodiments, a primary node, through programming, can select, through the execution of the programming agent, the location of memory address regions in the shared memory as reflected within a HMM visible to the primary node. Thus, non-contiguous or fragmented memory allocations can result in the shared memory based on the selection. In such a case, when two workloads are running, they can access corresponding memory address regions with the shared memory in parallel. The memory address regions correspond to programmed register entries within a register of a MPC, the register entries allowing memory transactions coming in to determine the address regions within the shared memory to be accessed by the memory transactions.

According to some embodiments, the programming agent may select the location of the memory address regions with the shared memory and thus fragment the shared memory into multiple non-contiguous segments based on expected memory access traffic for the DMA. In such embodiments, the programming agent may have information of expected traffic pattern (expected workload pattern through time) for the DMA, and may use such information to cause programming of the HMM and of one or more MPCs. The information of expected traffic pattern may, for example, be based on machine learning (ML)/the use of artificial intelligence (AI) through one or more performance monitoring programs.

Figure 6:
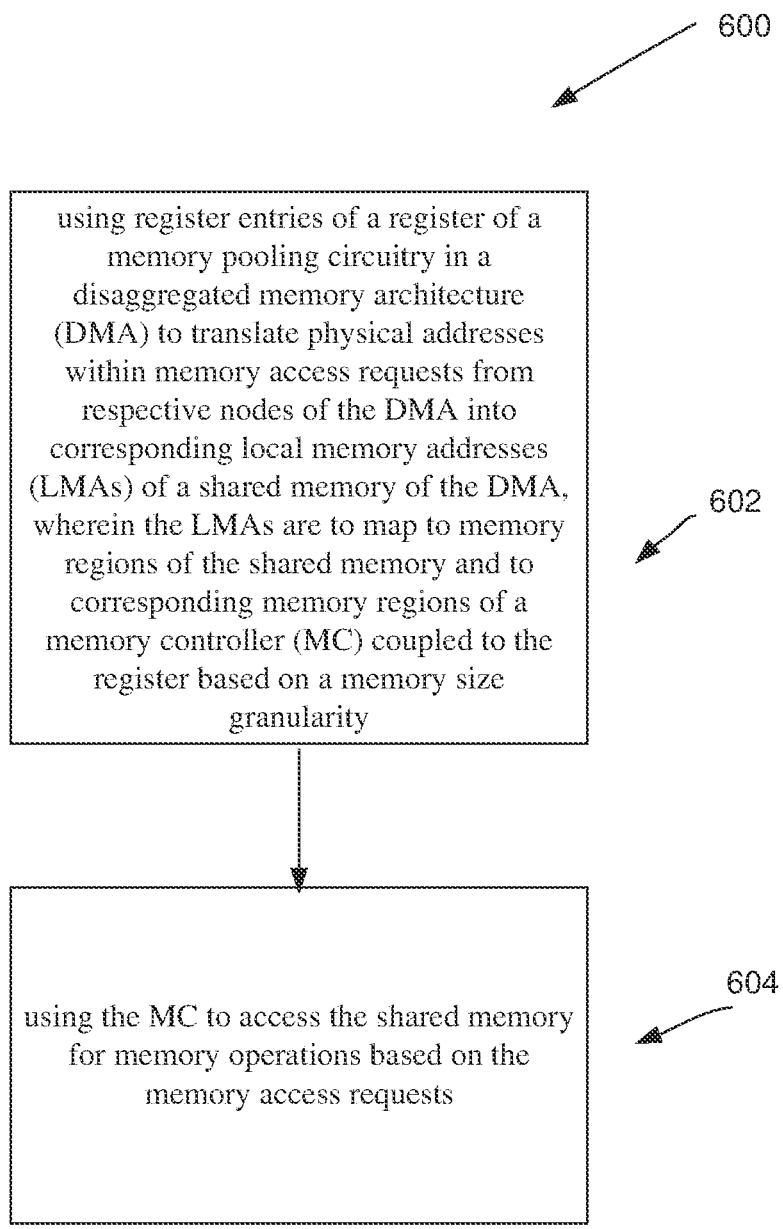
FIG. 6 is a flow diagram of a process according to some embodiments.

FIG. 6 illustrates an example of a process 600 to be performed at a MPC of a DMA according to some embodiments. The process includes, at operation 602, using register entries of a register of the MPC to translate host physical addresses (HPA) within memory access requests from respective nodes of the DMA into corresponding local memory addresses (LMAs) of a shared memory of the DMA, wherein the LMAs are to map to memory regions of the shared memory and to corresponding memory regions of a memory controller (MC) coupled to the register based on a memory size granularity. The process includes, at operation 604, using the MC to access the shared memory for memory operations based on the memory access requests.

The flow described in FIG. 6 is merely representative of operations that may occur in particular embodiments. In other embodiments, operations may be performed by any other ones of the components described above. Various embodiments of the present disclosure contemplate any suitable mechanisms for accomplishing the functions described herein. Some of the operations illustrated in any of FIGS. 4-6 may be repeated, combined, modified, or deleted where appropriate. Additionally, operations may be performed in any suitable order without departing from the scope of particular embodiments.

A design may go through various stages, from creation to simulation to fabrication. Data representing a design may represent the design in a number of manners. First, as is useful in simulations, the hardware may be represented using a hardware description language (HDL) or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In some implementations, such data may be stored in a database file format such as Graphic Data System II (GDS II), Open Artwork System Interchange Standard (OASIS), or similar format.

In some implementations, software based hardware models, and HDL and other functional description language objects can include register transfer language (RTL) files, among other examples. Such objects can be machine-parsable such that a design tool can accept the HDL object (or model), parse the HDL object for attributes of the described hardware, and determine a physical circuit and/or on-chip layout from the object. The output of the design tool can be used to manufacture the physical device. For instance, a design tool can determine configurations of various hardware and/or firmware elements from the HDL object, such as bus widths, registers (including sizes and types), memory blocks, physical link paths, fabric topologies, among other attributes that would be implemented in order to realize the system modeled in the HDL object. Design tools can include tools for determining the topology and fabric configurations of system on chip (SoC) and other hardware device. In some instances, the HDL object can be used as the basis for developing models and design files that can be used by manufacturing equipment to manufacture the described hardware. Indeed, an HDL object itself can be provided as an input to manufacturing system software to cause the described hardware.

In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of embodiments of the present disclosure. The machine-readable medium may be tangible and non-transitory.

In various embodiments, a medium storing a representation of the design may be provided to a manufacturing system (e.g., a semiconductor manufacturing system capable of manufacturing an integrated circuit and/or related components). The design representation may instruct the system to manufacture a device capable of performing any combination of the functions described above. For example, the design representation may instruct the system regarding which components to manufacture, how the components should be coupled together, where the components should be placed on the device, and/or regarding other suitable specifications regarding the device to be manufactured.

A module as used herein refers to any combination of hardware, software, and/or firmware. As an example, a module includes hardware, such as a micro-controller, associated with a non-transitory medium to store code adapted to be executed by the micro-controller. Therefore, reference to a module, in one embodiment, refers to the hardware, which is specifically configured to recognize and/or execute the code to be held on a non-transitory medium. Furthermore, in another embodiment, use of a module refers to the non-transitory medium including the code, which is specifically adapted to be executed by the microcontroller to perform predetermined operations. And as can be inferred, in yet another embodiment, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices.

Logic may be used to implement any of the flows described or functionality of the various components of FIGS. 2-4. In various embodiments, logic may include a microprocessor or other processing element operable to execute software instructions, discrete logic such as an application specific integrated circuit (ASIC), a programmed logic device such as a field programmable gate array (FPGA), a storage device containing instructions, combinations of logic devices (e.g., as would be found on a printed circuit board), or other suitable hardware and/or software. Logic may include one or more gates or other circuit components. In some embodiments, logic may also be fully embodied as software. Software may be embodied as a software package, code, instructions, instruction sets and/or data recorded on non-transitory computer readable storage medium. Firmware may be embodied as code, instructions or instruction sets and/or data that are hard-coded (e.g., nonvolatile) in storage devices.

Use of the phrase 'to' or 'configured to,' in one embodiment, refers to arranging, putting together, manufacturing, offering to sell, importing, and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'capable of/to,' and or 'operable to,' in one embodiment, refers to some apparatus, logic, hardware, and/or element designed in such a way to enable use of the apparatus, logic, hardware, and/or element in a specified manner. Note as above that use of to, capable to, or operable to, in one embodiment, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example, the decimal number ten may also be represented as a binary value of 1010 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The embodiments of methods, hardware, software, firmware, or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash storage devices; electrical storage devices; optical storage devices; acoustical storage devices; other form of storage devices for holding information received from transitory (propagated) signals (e.g., carrier waves, infrared signals, digital signals); etc., which are to be distinguished from the non-transitory mediums that may receive information there from.

Instructions used to program logic to perform embodiments of the disclosure may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

EXAMPLES OF SOME EMBODIMENTS ARE PROVIDED BELOW

Example 1 includes an apparatus of a disaggregated memory architecture (DMA), the DMA including nodes and a shared memory to be shared by the nodes, the apparatus comprising: a memory controller (MC); and a decoder coupled to the MC and having a register, the decoder to be coupled to a node of the DMA, and the register to store register entries therein dynamically programmable by the node, the decoder to use the register entries to translate physical addresses within memory access requests from respective nodes of the DMA into corresponding local memory addresses (LMAs) of the shared memory, wherein the LMAs are to map to memory regions of the shared memory and to corresponding memory regions of the MC based on a predetermined memory size granularity.

Example 2 includes the subject matter of Example 1, wherein the register entries are adapted to be erased and reprogrammed by the node after a reset operation on the shared memory.

Example 3 includes the subject matter of Example 1, wherein the register entries are based on expected traffic patterns of memory access requests with the DMA.

Example 4 includes the subject matter of Example 1, wherein at least some of the LMAs are to map to non-contiguous memory regions of the shared memory, and to non-contiguous corresponding memory regions of the MC.

Example 5 includes the subject matter of Example 1, wherein the decoder is to translate physical addresses within a memory access request from one of the respective nodes of the DMA into corresponding LMAs of the shared memory for said memory access request, wherein the LMAs of the shared memory for said memory access request are to map to memory regions of the shared memory and to corresponding memory regions of the MC based on a predetermined memory size granularity.

Example 6 includes the subject matter of Example 1, wherein the decoder is further to: receive the memory access requests from the respective nodes; and translate the physical addresses into the LMAs in response to a determination that the physical addresses correspond to one or more of the register entries.

Example 7 includes the subject matter of Example 1, wherein the decoder is a first decoder, the apparatus further including a plurality of second decoders similar to the first decoder and coupled to the MC.

Example 8 includes the subject matter of Example 1, wherein the MC is a first MC, the apparatus further including a plurality of second MCs similar to the first MC and coupled to the decoder.

Example 9 includes the subject matter of Example 8, wherein individual ones of the register entries include at least one a field to determine whether a memory access request to the register is valid, a field to indicate whether MC interleaving is applicable to the memory access request, or a field to determine respective MCs to process respective ones of the LMAs.

Example 10 includes the subject matter of Example 1, wherein the decoder is a first decoder and the MC is a first MC, the apparatus further including: a plurality of second decoders similar to the first decoder; and a plurality of second MCs similar to the first MC and coupled to the first decoder and the plurality of second decoders.

Example 11 includes the subject matter of Example 10, wherein each decoder of the first decoder and of the plurality of second decoders is programmable by the node, at least some of the first decoder and of the plurality of second decoders being programmable by the node to correspond to memory allocations within the shared memory that have different sizes with respect to one another.

Example 12 includes the subject matter of any one of Examples 7 and 10, wherein the register is a first register, at least some of the first decoder and the plurality of second decoders include a plurality of second registers similar to the first register.

Example 13 includes the subject matter of Example 1, wherein the register is a first register, the decoder further including a plurality of second registers similar to the first register.

Example 14 includes the subject matter of Example 1, wherein the memory size granularity is dynamically programmable to be one of 1 GB, 2 GB or 10 GB.

Example 15 includes a system of a disaggregated memory architecture (DMA), the system comprising: a cluster of nodes including respective processing units; a shared memory including a plurality of memory devices coupled to the cluster; and a plurality of memory pooling circuitries (MPCs) coupled to the cluster and to the shared memory, each of the MPCs including: a memory controller (MC); and a decoder coupled to the MC and having a register, the register to store register entries therein dynamically programmable by a primary node of the cluster, the decoder to use the register entries to translate physical addresses within memory access requests from the cluster into corresponding local memory addresses (LMAs) of the shared memory, wherein the LMAs are to map to memory regions of the shared memory and to corresponding memory regions of the MC based on a predetermined memory size granularity.

Example 16 includes the subject matter of Example 15, wherein the register entries are adapted to be erased and reprogrammed by the primary node after a reset operation on the shared memory.

Example 17 includes the subject matter of Example 15, wherein the register entries are based on expected traffic patterns of memory access requests within the DMA.

Example 18 includes the subject matter of Example 15, wherein at least some of the LMAs are to map to non-contiguous memory regions of the shared memory, and to non-contiguous corresponding memory regions of the MC.

Example 19 includes the subject matter of Example 15, wherein the decoder is to translate physical addresses within a memory access request from a node of the cluster into corresponding LMAs of the shared memory for said memory access request, wherein the LMAs of the shared memory for said memory access request are to map to memory regions of the shared memory and to corresponding memory regions of the MC based on a predetermined memory size granularity.

Example 20 includes the subject matter of Example 15, wherein the decoder is further to: receive the memory access requests from the respective nodes; and translate the physical addresses into the LMAs in response to a determination that the physical addresses correspond to one or more of the register entries.

Example 21 includes the subject matter of Example 15, wherein the decoder is a first decoder, said each of the MPCs further including a plurality of second decoders similar to the first decoder and coupled to the MC.

Example 22 includes the subject matter of Example 15, wherein the MC is a first MC, said each of the MPCs further including a plurality of second MCs similar to the first MC and coupled to the decoder.

Example 23 includes the subject matter of Example 22, wherein individual ones of the register entries include at least one a field to determine whether a memory access request to the register is valid, a field to indicate whether MC interleaving is applicable to the memory access request, or a field to determine respective MCs to process respective ones of the LMAs.

Example 24 includes the subject matter of Example 15, wherein the decoder is a first decoder and the MC is a first MC, said each of the MPCs further including: a plurality of second decoders similar to the first decoder; and a plurality of second MCs similar to the first MC and coupled to the first decoder and the plurality of second decoders.

Example 25 includes the subject matter of Example 24, wherein each decoder of the first decoder and of the plurality of second decoders is programmable by the primary node, at least some of the first decoder and of the plurality of second decoders being programmable by the primary node to correspond to memory allocations within the shared memory that have different sizes with respect to one another.

Example 26 includes the subject matter of any one of Examples 21 and 24, wherein the register is a first register, at least some of the first decoder and the plurality of second decoders include a plurality of second registers similar to the first register.

Example 27 includes the subject matter of Example 15, wherein the register is a first register, the decoder further including a plurality of second registers similar to the first register.

Example 28 includes the subject matter of Example 15, wherein the memory size granularity is dynamically programmable to be one of 1 GB, 2 GB or 10 GB.

Example 29 includes a method to be performed at an memory pooling circuitry (MPC) of a disaggregated memory architecture (DMA), the DMA including nodes and a shared memory to be shared by the nodes, the method comprising: using register entries of a register to translate physical addresses within memory access requests from respective nodes of the DMA into corresponding local memory addresses (LMAs) of the shared memory, wherein the LMAs are to map to memory regions of the shared memory and to corresponding memory regions of a memory controller (MC) coupled to the register based on a memory size granularity; and using the MC to access the shared memory for memory operations based on the memory access requests.

Example 30 includes the subject matter of Example 29, wherein the memory access requests are first memory address requests, the physical addresses are first physical addresses, the LMAs are first LMAs, and the memory size granularity is a first memory size granularity, the method further including: after a reset operation on the shared memory, using the register entries to translate second physical addresses within second memory access requests from respective nodes of the DMA into corresponding second local memory addresses (LMAs) of the shared memory, wherein the second LMAs are to map to memory regions of the shared memory and to corresponding memory regions of a memory controller (MC) coupled to the register based on a second memory size granularity different from the first memory size granularity; and using the MC to access the shared memory for memory operations based on the second memory access requests.

Example 31 includes the subject matter of Example 29, wherein the register entries are based on expected traffic patterns of memory access requests with the DMA.

Example 32 includes the subject matter of Example 29, wherein at least some of the LMAs are to map to non-contiguous memory regions of the shared memory, and to non-contiguous corresponding memory regions of the MC.

Example 33 includes the subject matter of Example 29, further including translating physical addresses within a memory access request from one of the respective nodes of the DMA into corresponding LMAs of the shared memory for said memory access request, wherein the LMAs of the shared memory for said memory access request are to map to memory regions of the shared memory and to corresponding memory regions of the MC based on a predetermined memory size granularity.

Example 34 includes the subject matter of Example 29, further including: receiving the memory access requests from the respective nodes; and translating the physical addresses into the LMAs in response to a determination that the physical addresses correspond to one or more of the register entries.

Example 35 includes the subject matter of Example 29, wherein individual ones of the register entries include at least one a field to determine whether a memory access request to the register is valid, a field to indicate whether MC interleaving is applicable to the memory access request, or a field to determine respective MCs of the MPC to process respective ones of the LMAs.

Example 36 includes the subject matter of Example 29, wherein the memory size granularity is dynamically programmable to be one of 1 GB, 2 GB or 10 GB.

Example 37 includes at least one non-transitory machine readable storage medium having instructions stored thereon, the instructions, when executed by an apparatus of a disaggregated memory architecture (DMA), to cause the apparatus to perform operations including: using register entries of a register to translate physical addresses within memory access requests from respective nodes of the DMA into corresponding local memory addresses (LMAs) of the shared memory, wherein the LMAs are to map to memory regions of the shared memory and to corresponding memory regions of a memory controller (MC) coupled to the register based on a memory size granularity; and using the MC to access the shared memory for memory operations based on the memory access requests.

Example 38 includes the subject matter of Example 37, wherein the memory access requests are first memory address requests, the physical addresses are first physical addresses, the LMAs are first LMAs, and the memory size granularity is a first memory size granularity, the operations further including: after a reset operation on the shared memory, using the register entries to translate second physical addresses within second memory access requests from respective nodes of the DMA into corresponding second local memory addresses (LMAs) of the shared memory, wherein the second LMAs are to map to memory regions of the shared memory and to corresponding memory regions of a memory controller (MC) coupled to the register based on a second memory size granularity different from the first memory size granularity; and using the MC to access the shared memory for memory operations based on the second memory access requests.

Example 39 includes the subject matter of Example 37, wherein the register entries are based on expected traffic patterns of memory access requests with the DMA.

Example 40 includes the subject matter of Example 37, wherein at least some of the LMAs are to map to non-contiguous memory regions of the shared memory, and to non-contiguous corresponding memory regions of the MC.

Example 41 includes the subject matter of Example 37, the operations further including translating physical addresses within a memory access request from one of the respective nodes of the DMA into corresponding LMAs of the shared memory for said memory access request, wherein the LMAs of the shared memory for said memory access request are to map to memory regions of the shared memory and to corresponding memory regions of the MC based on a predetermined memory size granularity.

Example 42 includes the subject matter of Example 37, the operations further including: receiving the memory access requests from the respective nodes; and translating the physical addresses into the LMAs in response to a determination that the physical addresses correspond to one or more of the register entries.

Example 43 includes the subject matter of Example 36, wherein individual ones of the register entries include at least one a field to determine whether a memory access request to the register is valid, a field to indicate whether MC interleaving is applicable to the memory access request, or a field to determine respective MCs of the MPC to process respective ones of the LMAs.

Example 44 includes the subject matter of Example 37, wherein the memory size granularity is dynamically programmable to be one of 1 GB, 2 GB or 10 GB.

Example 45 includes at least one non-transitory machine readable storage medium having instructions stored thereon, the instructions, when executed by a computing system of a disaggregated memory architecture (DMA) including a shared memory, to cause the computing system to perform operations including: prior to memory access requests to access the shared memory, causing a programming of a memory pooling circuitry (MPC) including causing a programming of register entries of one or more registers of the MPC with information to be used by a decoder of the MPC to translate physical addresses of memory access requests to local memory addresses (LMAs) such that the LMAs are processed by one or more memory controllers (MCs) coupled to the one or more registers based on MC memory regions in each of the one or more MCs, the MC memory regions having a predetermined memory size granularity; and processing memory access requests from the MPC based on the LMAs.

Example 46 includes the subject matter of Example 45, wherein the LMAs map to memory regions of the shared memory based on the predetermined memory size granularity.

Example 47 includes the subject matter of Example 45, the operations further including erasing and reprogramming the MPC after a reset operation on the shared memory.

Example 48 includes the subject matter of Example 45, the operations further including: determining an expected traffic pattern of the memory access requests; and causing programming such that the register entries are based on the expected traffic patterns.

Example 49 includes the subject matter of Example 45, wherein at least some of the LMAs are to map to non-contiguous memory regions of the shared memory, and to non-contiguous corresponding memory regions of the one or more MCs.

Example 50 includes the subject matter of Example 45, wherein the memory access requests are from one of a plurality of computing systems of the DMA.

Example 51 includes the subject matter of Example 45, the operations further including causing a programming of register entries of a plurality of registers of the MPC with information to be used by a plurality of respective decoders of the MPC to translate the physical addresses to the LMAs.

Example 52 includes the subject matter of Example 45, the operations further including using a memory management unit of the computing system to cause the programming.

Example 53 includes the subject matter of Example 51, wherein individual ones of the register entries include at least one a field to determine whether a memory access request to the one or more registers is valid, a field to indicate whether MC interleaving is applicable to the memory access request, or a field to determine respective MCs of the MPC to process respective ones of the LMAs.

Example 54 includes the subject matter of Example 51, the operations further including causing programming of the shared memory such that memory allocations within the shared memory for respective decoders of the MPC have different sizes with respect to one another.

Example 55 includes the subject matter of Example 45, wherein the operations further including dynamically programming the memory size granularity to be one of 1 GB, 2 GB or 10 GB.

Example 56 includes a method to be performed at a computing system of a disaggregated memory architecture (DMA), the method including performing the operations of any one of claims 45-55.

Example 57 includes a computing system of a disaggregated memory architecture (DMA), the computing system to perform the operations of any one of claims 45-55.

Example 58 includes an apparatus of a disaggregated memory architecture (DMA), the apparatus including means to perform the method of any one of claims 29-36.

Example 59 includes a computing system of a disaggregated memory architecture (DMA), the computing system including means to perform the operations of any one of claims 45-55.

Reference throughout this specification to "one embodiment" or "an embodiment" means that a particular feature, structure, or characteristic described in connection with the embodiment is included in at least one embodiment of the present disclosure. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

What is claimed is:

1. An apparatus of a disaggregated memory architecture (DMA), the DMA including nodes and a shared memory to be shared by the nodes, the apparatus comprising:
   a memory controller (MC); and
   a decoder coupled to the MC and having a register, the decoder to be coupled to a node of the DMA, and the register to store register entries therein dynamically programmable by the node, the decoder to use the register entries to translate host physical addresses (HPA) within memory access requests from respective nodes of the DMA into corresponding local memory addresses (LMAs) of the shared memory, wherein the LMAs are to map to memory regions of the shared memory and to corresponding memory regions of the MC based on a predetermined memory size granularity.

2. The apparatus of claim 1, wherein the register entries are adapted to be erased and reprogrammed by the node after a reset operation on the shared memory.

3. The apparatus of claim 1, wherein the register entries are based on expected traffic patterns of memory access requests with the DMA.

4. The apparatus of claim 1, wherein at least some of the LMAs are to map to non-contiguous memory regions of the shared memory, and to non-contiguous corresponding memory regions of the MC.

5. The apparatus of claim 1, wherein the decoder is to translate host physical addresses (HPA) within a memory access request from one of the respective nodes of the DMA into corresponding LMAs of the shared memory for said memory access request, wherein the LMAs of the shared memory for said memory access request are to map to memory regions of the shared memory and to corresponding memory regions of the MC based on a predetermined memory size granularity.

6. The apparatus of claim 1, wherein the decoder is further to:
   receive the memory access requests from the respective nodes; and
   translate the host physical addresses (HPA) into the LMAs in response to a determination that the host physical addresses (HPA) correspond to single register entry.

7. The apparatus of claim 1, wherein the decoder is a first decoder and the MC is a first MC, the apparatus further including:
   a plurality of second decoders similar to the first decoder; and
   a plurality of second MCs similar to the first MC and coupled to the first decoder and the plurality of second decoders.

8. The apparatus of claim 7, wherein individual ones of the register entries include at least one field to determine whether a memory access request to the register is valid, a field to indicate whether MC interleaving is applicable to the memory access request, or a field to determine respective MCs to process respective ones of the LMAs.

9. The apparatus of claim 7, wherein each decoder of the first decoder and of the plurality of second decoders is programmable by the node, at least some of the first decoder and of the plurality of second decoders being programmable by the node to correspond to memory allocations within the shared memory that have different sizes with respect to one another.

10. The apparatus of claim 7, wherein the register is a first register, at least some of the first decoder and the plurality of second decoders include a plurality of second registers similar to the first register.

11. The apparatus of claim 1, wherein the memory size granularity is dynamically programmable to be one of 256 KB, 512 KB, 1 GB, 2 GB or 10 GB.

12. A system of a disaggregated memory architecture (DMA), the system comprising:
   a cluster of nodes including respective processing units;
   a shared memory including a plurality of memory devices coupled to the cluster; and
   a plurality of memory pooling circuitries (MPCs) coupled to the cluster and to the shared memory, each of the MPCs including:
      a memory controller (MC); and
      a decoder coupled to the MC and having a register, the register to store register entries therein dynamically programmable by a primary node of the cluster, the decoder to use the register entries to translate host physical addresses (HPA) within memory access requests from the cluster into corresponding local memory addresses (LMAs) of the shared memory, wherein the LMAs are to map to memory regions of the shared memory and to corresponding memory regions of the MC based on a predetermined memory size granularity.

13. The system of claim 12, wherein the register entries are adapted to be erased and reprogrammed by the primary node after a reset operation on the shared memory.

14. The system of claim 12, wherein the register entries are based on expected traffic patterns of memory access requests within the DMA.

15. The system of claim 12, wherein at least some of the LMAs are to map to non-contiguous memory regions of the shared memory, and to non-contiguous corresponding memory regions of the MC.

16. The system of claim 12, wherein the decoder is to translate host physical addresses (HPA) within a memory access request from a node of the cluster into corresponding LMAs of the shared memory for said memory access request, wherein the LMAs of the shared memory for said memory access request are to map to memory regions of the shared memory and to corresponding memory regions of the MC based on a predetermined memory size granularity.

17. The system of claim 12, wherein the decoder is further to:
   receive the memory access requests from the respective nodes; and
   translate the host physical addresses (HPA) into the LMAs in response to a determination that the host physical addresses (HPA) correspond to one or more of the register entries.

18. At least one non-transitory machine readable storage medium having instructions stored thereon, the instructions, when executed by an apparatus of a disaggregated memory architecture (DMA) including nodes and a shared memory to be shared by the nodes, to cause the apparatus to perform operations including:
   using register entries of a register to translate host physical addresses (HPA) within memory access requests from respective nodes of the DMA into corresponding local memory addresses (LMAs) of the shared memory, wherein the LMAs are to map to memory regions of the shared memory and to corresponding memory regions of a memory controller (MC) coupled to the register based on a memory size granularity; and
   using the MC to access the shared memory for memory operations based on the memory access requests.

19. The storage medium of claim 18, wherein the memory access requests are first memory address requests, the host physical addresses (HPA) are first host physical addresses (HPA), the LMAs are first LMAs, and the memory size granularity is a first memory size granularity, the operations further including:
   after a reset operation on the shared memory, using the register entries to translate second host physical addresses (HPA) within second memory access requests from respective nodes of the DMA into corresponding second local memory addresses (LMAs) of the shared memory, wherein the second LMAs are to map to memory regions of the shared memory and to corresponding memory regions of a memory controller (MC) coupled to the register based on a second memory size granularity different from the first memory size granularity; and
   using the MC to access the shared memory for memory operations based on the second memory access requests.

20. The storage medium of claim 18, wherein the register entries are based on expected traffic patterns of memory access requests with the DMA.

* * * * *